US010486182B2

(12) United States Patent
Raman et al.

(10) Patent No.: US 10,486,182 B2
(45) Date of Patent: Nov. 26, 2019

(54) PAINT OVERSPRAY REMOVAL SHROUD

(71) Applicant: RevolutioNice Inc., Belleville, NJ (US)

(72) Inventors: Sreenivas Raman, Park Ridge, NJ (US); Brian Jennings, Hawthorne, CA (US); Ryan J. Giovacchini, Hamilton, NJ (US); Leonard Weinstein, Newport News, VA (US)

(73) Assignee: RevolutioNice Inc., Belleville, NJ (US)

( * ) Notice: Subject to any disclaimer, the term of this patent is extended or adjusted under 35 U.S.C. 154(b) by 221 days.

(21) Appl. No.: 15/658,329

(22) Filed: Jul. 24, 2017

(65) Prior Publication Data

US 2018/0021799 A1 Jan. 25, 2018

Related U.S. Application Data

(60) Provisional application No. 62/365,893, filed on Jul. 22, 2016, provisional application No. 62/365,897, filed on Jul. 22, 2016.

(51) Int. Cl.
*B05D 3/04* (2006.01)
*B05B 14/00* (2018.01)
*B05D 1/02* (2006.01)
*B05B 14/30* (2018.01)

(52) U.S. Cl.
CPC ............. *B05B 14/00* (2018.02); *B05B 14/30* (2018.02); *B05D 1/02* (2013.01); *B05D 3/0493* (2013.01)

(58) Field of Classification Search
None
See application file for complete search history.

(56) References Cited

U.S. PATENT DOCUMENTS 5,360,165 A * 11/1994 Singhal ................... B05B 14/30
239/122
6,171,656 B1 * 1/2001 Settles .................... B05B 14/30
427/294

* cited by examiner

*Primary Examiner* — Nathan T Leong
(74) *Attorney, Agent, or Firm* — Brient IP Law, LLC

(57) ABSTRACT

A shroud device (e.g., a paint sprayer shroud), according to particular embodiments, is configured to capture overspray (e.g., paint or other material that is applied to an unintended location) and/or increase an amount of paint that is delivered to a desired location (e.g., on a wall being painted, etc.). In various embodiments, the shroud device is configured for use in conjunction with a sprayer (e.g., such as any suitable paint spryer or other sprayer). In particular embodiments, the shroud device may comprise a blower portion and a suction portion that work in conjunction to recirculate overspray into a sprayer flow and onto a medium, for example, via a recirculation shroud.

17 Claims, 13 Drawing Sheets

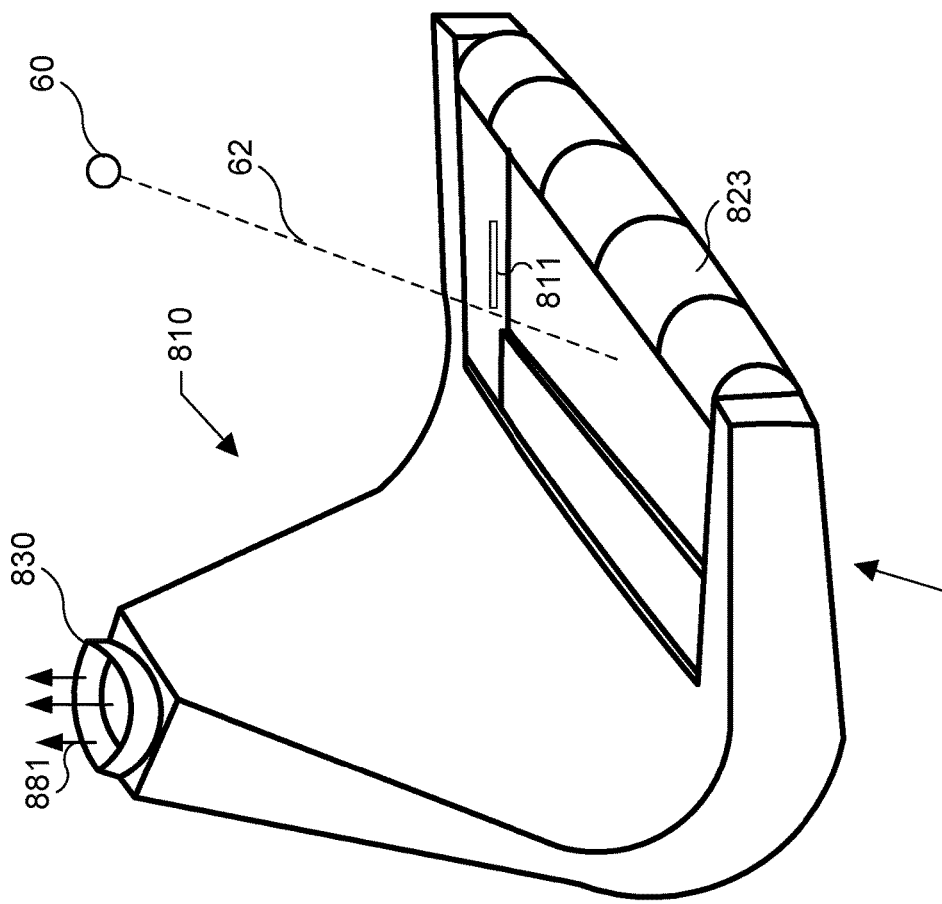

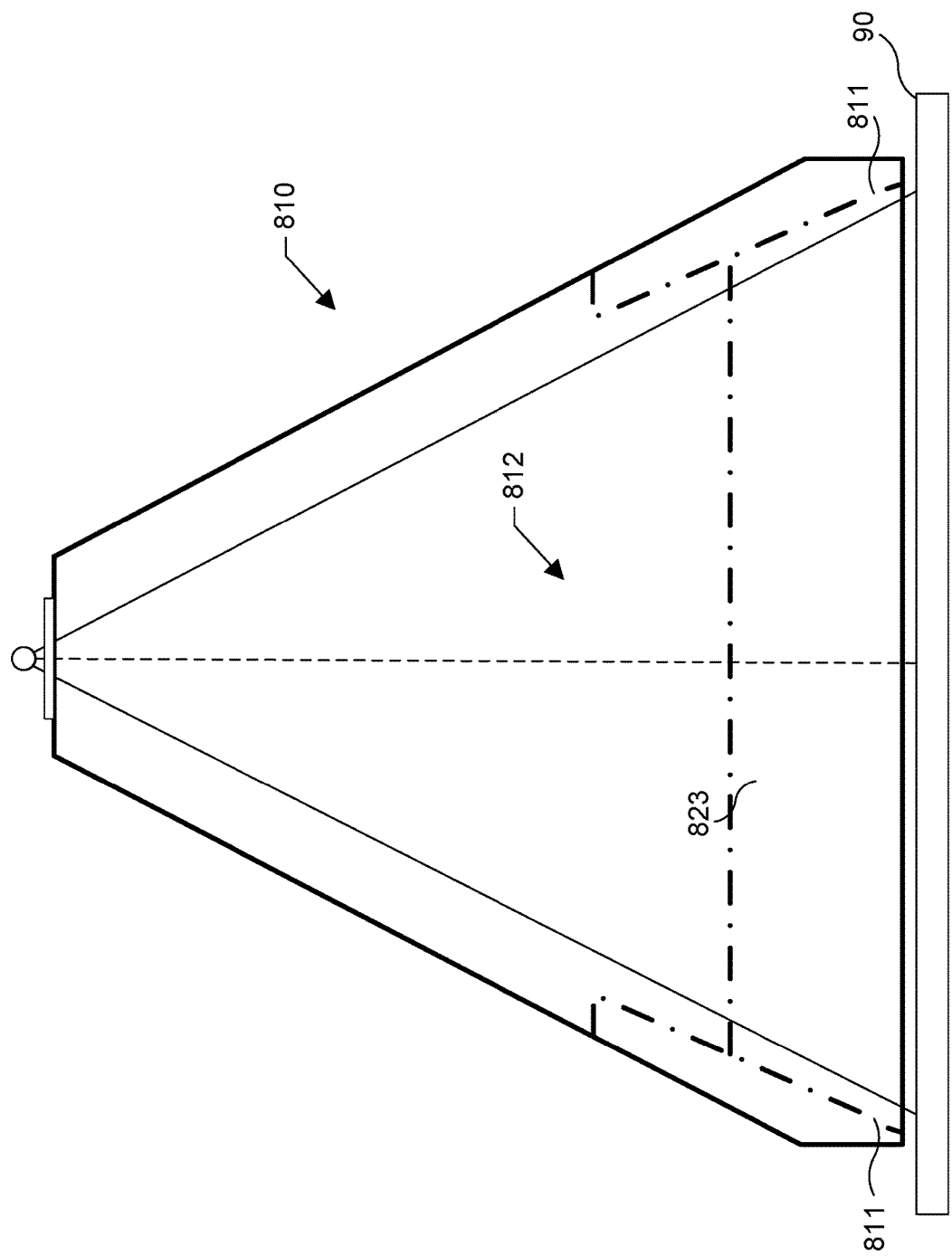

PAINT OVERSPRAY REMOVAL SHROUD

BACKGROUND

Painting can be a labor-intensive, costly process. Additionally, traditional painting techniques often result in excessive waste (e.g., in terms of paint consumption, brushes, etc.) or result in the release of potentially hazardous chemicals into the air (e.g., via paint spraying). Accordingly, there is a need for improved systems and methods that address these and other needs.

BRIEF DESCRIPTION OF THE DRAWINGS

Various embodiments of a shroud device and overspray capture system are described below. In the course of this description, reference will be made to the accompanying drawings, which are not necessarily drawn to scale, and wherein:

FIG. 8A is a perspective view of a shroud device according to a particular embodiment including a flow reverse half cylinder.

FIG. 8C is a rear view of a shroud device according to a particular embodiment including a flow reverse half cylinder.

SUMMARY

Figure 1:
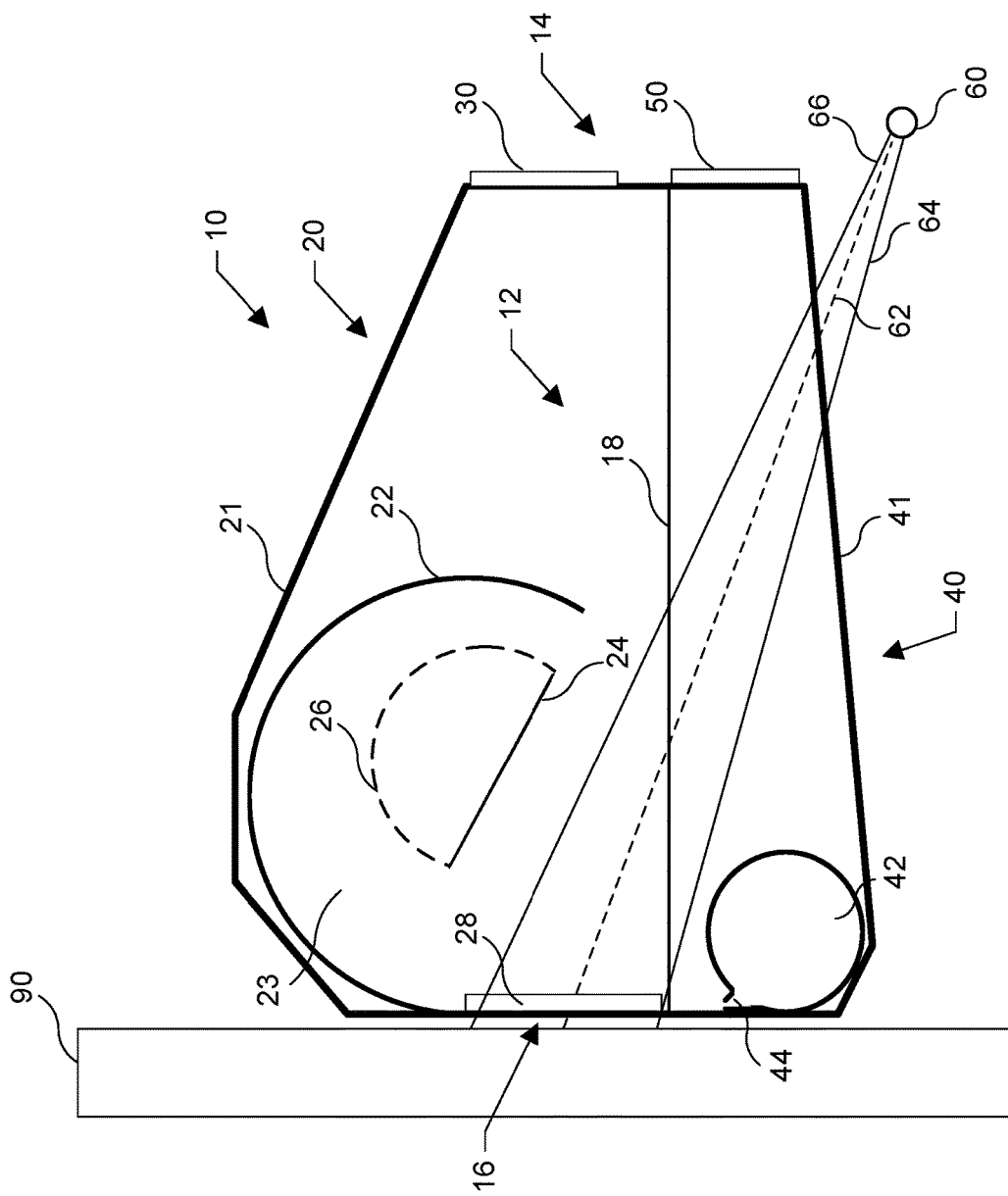
FIG. 1 is a side cutaway view of a shroud device according to a particular embodiment.

A shroud device for use in spraying applications, according to various embodiments, has a base portion and a spray release end. In further embodiments, the shroud device defines an open area within the shroud device. In particular embodiments, the shroud device comprises a suction portion and a blowing portion. In some embodiments, the suction portion comprises a suction frame flaring from the base portion to the spray release end. In other embodiments, the suction portion defines a suction access cutaway adjacent the base portion and a spray cutaway disposed adjacent the spray release end. In still other embodiments, the suction frame comprises a recirculation shroud, the recirculation shroud being in communication with the suction access cutaway and defining at least one suction hole. In various embodiments, the spray cutaway is dimensioned to enable spray from a sprayer to pass through the shroud device such that at least a portion of the spray is deposited upon a medium via the spray cutaway.

In particular embodiments, the blowing portion comprises a blowing frame flaring from the base portion to the spray release end. In some embodiments, the blowing portion defines a blower access cutaway adjacent the base portion, and comprises a blowing tube disposed adjacent the spray release end. In some embodiments, the blowing tube is in communication with the blower access cutaway and defines at least one blowing slot. In particular embodiments, the blowing portion and the suction portion are co-facing. In some embodiments, the blowing portion and suction portion are integrally formed. In still other embodiments, the shroud device is configured to recirculate a plurality of overspray droplets from the spray within the shroud device via a combination of a suction force introduced within the shroud via the at least one suction hole and a blowing force introduced within the shroud via the at least one blowing slot.

A paint sprayer shroud for recirculating at least a portion of a plurality of overspray droplets from a sprayer back into a sprayer flow from the sprayer and onto a wall, according to various embodiments, comprises: (1) a suction frame flaring from a base portion to a planar spray release end, defining a suction access cutaway adjacent the base portion and a spray cutaway disposed adjacent the spray release end; and (2) a blowing frame flaring from the base portion to the spray release end, and defining a blower access cutaway adjacent the base portion.

In some embodiments, the suction frame comprises a curved recirculation shroud and a suction tube, the suction tube being in communication with the suction access cutaway and defining a plurality of suction holes. In other embodiments, the spray cutaway is dimensioned to enable spray from a sprayer to pass through the paint sprayer shroud such that at least a portion of the spray is deposited upon a medium via the spray cutaway. In various embodiments, the blowing frame comprises a blowing tube disposed adjacent the spray release end, the blowing tube being in communication with the blower access cutaway and defining at least one blowing slot. In particular embodiments, the recirculation shroud is dimensioned to recirculate at least a portion of the plurality of overspray droplets back into the sprayer flow and onto the medium. In various embodiments, the paint sprayer shroud is configured to direct airflow via the at least one spray cutaway such that the airflow directs the plurality of overspray droplets upward toward the recirculation shroud.

DETAILED DESCRIPTION OF VARIOUS EMBODIMENTS

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

OVERVIEW

A shroud device (e.g., a paint sprayer shroud), according to particular embodiments, is configured to capture overspray (e.g., paint or other material that is applied to an unintended location) and/or increase an amount of paint that is delivered to a desired location (e.g., on a wall being painted, etc.). In various embodiments, the shroud device is configured for use in conjunction with a sprayer (e.g., such as any suitable paint spryer or other sprayer). In particular embodiments, the shroud device may comprise the sprayer.

In various embodiments, the shroud device comprises one or more vacuum and/or blower channels configured to cooperate to manipulate a sprayed material (e.g., paint) within the shroud device. In other embodiments, the one or more vacuum channels may comprise one or more suction channels. The shroud device may, for example, comprise one or more blower channels configured to bias a flow of one or more of a plurality of paint droplets that make up overspray from the sprayer back into the shroud device (e.g., as opposed to into the air, onto an unintended location, etc.). The shroud device may, for example, be configured to operate a substantially fixed distance (e.g., a fixed distance) from a surface being painted (e.g., to facilitate the biasing of the plurality of paint droplets back into the shroud device via the directed airflow).

In various embodiments, the one or more blower and/or vacuum channels may facilitate an introduction of one or more blowing or sucking forces within the shroud device. The one or more blowing and/or suction forces may cooperate to produce a turning airflow within the shroud device that is configured to recirculate at least a portion of the overspray (e.g., the plurality of droplets that make up the overspray) back into the sprayer flow (e.g., and, in the case of at least a portion of the overspray, ultimately onto the desired medium).

Various embodiments of a shroud device are described in more detail below.

Asymmetrical Shroud

FIG. 1 depicts a side cutaway view an asymmetrical shroud device 10 according to a particular embodiment. As may be understood from this figure, the asymmetrical shroud device 10 comprises: (1) an upper suction portion 20; and (2) a lower blowing portion 40. As may be understood from this figure, the asymmetrical shroud device 10 is configured to be utilized in combination with a sprayer 60 in order to apply a substance (e.g., paint) to a suitable medium 90 (e.g., such as a wall or other suitable medium).

In the embodiment shown in FIG. 1, the upper suction portion 20 comprises a suction frame 21 that extends from a base portion 14 of the asymmetrical shroud device 10 to a spray release end 16 of the asymmetrical shroud device 10. FIG. 2 depicts a bottom, cutaway view of the upper suction portion 20 viewed along the line 18 shown in FIG. 1. As may be further understood from FIG. 2, the suction frame 21 flares from the base portion 14 to the spray release end 16 of the of the upper suction portion 20.

As further depicted in FIGS. 1 and 2, the suction frame 21 defines a spray cutaway 28 disposed adjacent the spray release end 16, and a suction access cutaway 30 adjacent the base end 14. In particular embodiments the spray cutaway 28 is substantially rectangular (e.g., rectangular) and sized to accommodate a spray 62 from the sprayer 60 that has a spray fan defined by a first and second approximate spray boundary 64,66. In other embodiments, the spray cutaway 28 is dimensioned to enable spray 62 from the sprayer 60 to pass through the shroud device such that at least a portion of the spray 62 is deposited upon the medium 90. In various embodiments, the spray fan 62 may be defined by one or more characteristics of the sprayer (e.g., spray pressure, etc.). In other embodiments, the spray cutaway may comprise any other suitable shape (e.g., elliptical, circular, etc.).

In various other embodiments, the suction frame may define one or more side suction cutaways configured to provide suction to recapture any side overspray (e.g., overspray that would tend to the left or right of the shroud during spraying along the medium 90). In various embodiments, the one or more side suction cutaways may be in operable communication with the suction access cutaway 30 to provide suction to the one or more side suction cutaways. In various embodiments, the side suction cutaways may be disposed on either side of the spray cutaway 28.

In particular embodiments, the spray cutaway 28 is substantially planar (e.g., planar). In such embodiments, the spray cutaway 28 is configured such that each portion of the spray cutaway 28 is a substantially fixed distance from a medium 90 (e.g., a flat medium such as a wall) when the shroud device 10 is positioned such that the spray cutaway 28 is substantially parallel (e.g., parallel) to the medium 90. In particular other embodiments, the spray release end 16 of the shroud device 10 is substantially planar (e.g., planar) and comprises a substantially rectangular (e.g., rectangular) area in which the spray cutaway 28 is defined.

In various embodiments, the suction access cutaway 30 is substantially rectangular (e.g., rectangular). In other embodiments, the suction access cutaway 30 may have any other suitable shape (e.g., circular, elliptical, square, polygonal, etc.). In particular embodiments, the suction access cutaway 30 is configured to enable a vacuum or other pressure regulation device to couple with the shroud device 10 such that the vacuum is in operative communication with the shroud device 10.

In various embodiments, the upper suction portion 20 further comprises a recirculation shroud 22 comprising a suction tube 24 defining a plurality of suction holes 26. In the embodiment shown in FIG. 1, the recirculation shroud 22 is substantially curved (e.g., defines a partially circular surface) and at least partially open to an open area 12 of the shroud device 10 via a recirculation channel 23. In various embodiments, the recirculation shroud 22 comprises any suitable hydrophobic material (e.g., a super-hydrophobic material).

As may be understood from FIG. 1, the suction tube 24 is substantially semi-circular (e.g., semi-circular). In other embodiments, the suction tube 24 may be any other suitable shape (e.g., circular, elliptical, cylindrical, etc.). As may be further understood from FIG. 1, the suction tube 24 defines the plurality of suction holes 26 on a curved portion of the suction tube 24 that is substantially co-facing with the recirculation shroud 22. In other embodiments the base potion of the suction tube 24 may comprise one or more suction holes 26. In other embodiments, the suction tube may comprise one or more suction holes 26 disposed on any suitable portion of the suction tube 24 (e.g., any suitable portion adjacent the medium 90). In particular embodiments, the suction tube 24 is in communication with the suction access cutaway 30.

As shown in FIG. 2, the suction frame 21 comprise: (1) a first suction frame sidewall 32; and (2) a second suction frame sidewall 36. In the embodiment shown in this figure, the first suction frame sidewall 32 defines a first enclosed suction frame sidewall chamber 34, the first enclosed suction frame sidewall chamber extending at least between a first end 25 of the suction tube 24 and the suction access cutaway 30. As may be understood from this figure, the first enclosed suction frame sidewall chamber 32 facilitates the communication between the suction access cutaway 30 and the suction tube 24.

The second suction frame sidewall 36 defines a second enclosed suction frame sidewall chamber 38, the second enclosed suction frame sidewall chamber extending at least between a second end 27 of the suction tube 24 and the suction access cutaway 30. As may be understood from this figure, the second enclosed suction frame sidewall chamber 38 facilitates the communication between the suction access cutaway 30 and the suction tube 24.

In various embodiments, the suction tube 24 extends between the first and second suction frame sidewalls, 32, 36 (e.g., between the first and second enclosed suction frame sidewall chambers 34, 38). In various embodiments, the suction tube 25, first enclosed suction frame sidewall chamber 34, and second enclosed suction frame sidewall chamber 38 define a substantially continuous channel configured for the transmission of airflow.

Figure 2:
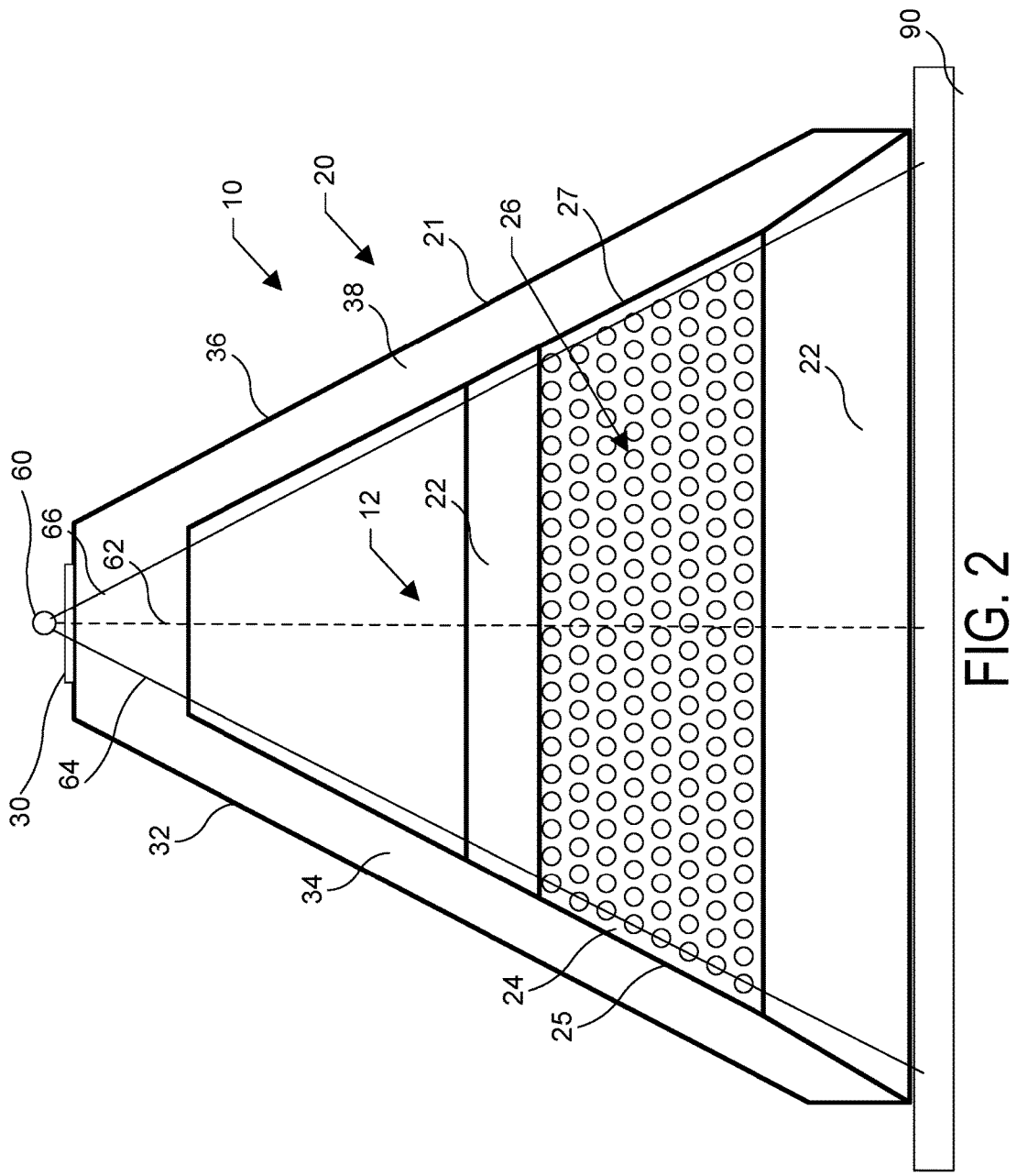
FIG. 2 is a bottom cutaway view of the shroud device shown in FIG. 1, showing an upper suction portion of the shroud device.

As shown in FIG. 2, the recirculation shroud 22, the first suction frame sidewall 32, and the second suction frame sidewall 36 define at least a portion of the open area 12 within the shroud device 10. In various embodiments, the plurality of suction holes 26 facilitate operative communication between the suction access cutaway 30 and the open area 12 (e.g., the recirculation channel 23 shown in FIG. 1). In particular embodiments, the open area 12 comprises the recirculation channel 23. In some embodiments, the plurality of suction holes 26 comprise a plurality of substantially circular suction holes (e.g., circular suction holes). In other embodiments, the plurality of suction holes 26 may comprise one or more suction holes having any suitable shape (e.g., elliptical, rectangular, polygonal, etc.). In various embodiments, the shroud device 10 may comprise any suitable number of suction holes 26. For example, in a particular embodiment, the shroud device 10 defines up to about 360 suction holes (e.g., 360 suction holes) or any other suitable number.

In particular embodiments, the shroud device 10 comprises a lower blowing portion 40. In the embodiment shown in FIGS. 1 and 3 (which depicts a top, cross-sectional view of the lower blowing portion 40 viewed along the line 18 shown in FIG. 1), the lower blowing portion 40 comprises a blowing frame 41 that flares from the base portion 14 to the spray release end 16 and defines a blower access cutaway 50 adjacent the base portion 14.

In various embodiments, the blower access cutaway 50 is substantially rectangular (e.g., rectangular). In other embodiments, the suction access cutaway 30 may have any other suitable shape (e.g., circular, elliptical, square, polygonal, etc.). In particular embodiments, the blower access cutaway 50 is configured to enable a blower or other pressure regulation device to couple with the shroud device 10 such that the blower is in operative communication with the shroud device 10.

In various embodiments, the lower blowing portion 40 comprises a substantially circular (e.g., circular) blowing tube 42 adjacent the spray release end 16. In some embodiments, the blowing tube 42 defines at least one blowing slot 44. In particular embodiments, the at least one blowing slot 44 is substantially rectangular (e.g., rectangular). In some embodiments, the at least one blowing slot is at least generally directed toward the spray cutaway 28.

Figure 3:
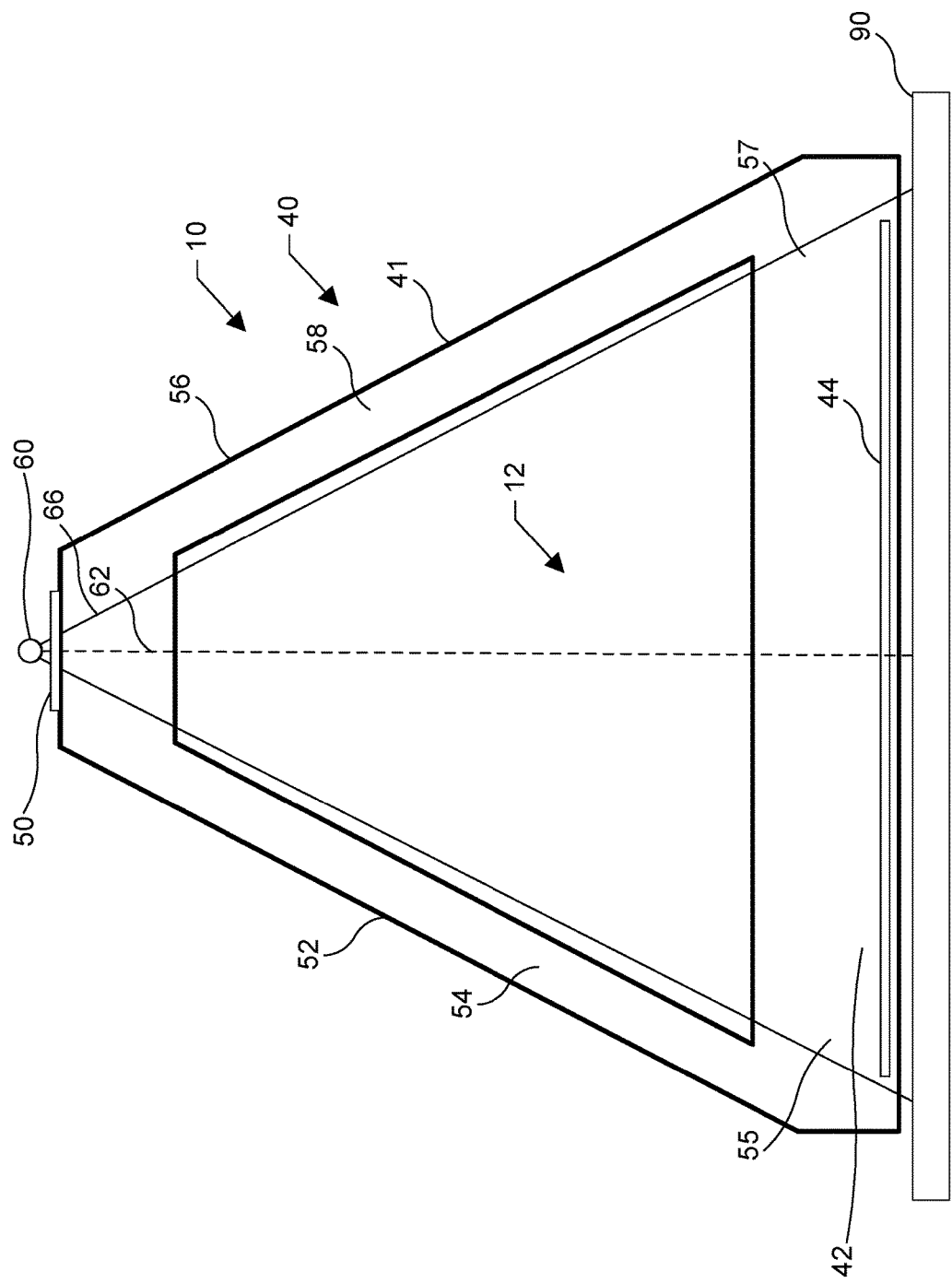
FIG. 3 is a top cutaway view of the shroud device shown in FIG. 1, showing a lower blowing portion of the shroud device.

In various embodiments, as may be understood from FIG. 3, the blower frame 41 comprises: (1) a first blowing frame sidewall 52; and (2) a second blowing frame sidewall 56. In the embodiment shown in this figure, the first blowing frame sidewall 52 defines a first enclosed blowing frame sidewall chamber 54, the first enclosed blowing frame sidewall chamber extending at least between a first end 55 of the blowing tube 42 and the blower access cutaway 50. As may be understood from this figure, the first enclosed blowing frame sidewall chamber 52 facilitates the communication between the blower access cutaway 50 and the blowing tube 42.

The second blowing frame sidewall 56 defines a second enclosed blowing frame sidewall chamber 58, the second enclosed blowing frame sidewall chamber extending at least between a second end 57 of the blowing tube 42 and the blower access cutaway 50. As may be understood from this figure, the second enclosed blowing frame sidewall chamber 58 facilitates the communication between the blower access cutaway 50 and the blowing tube 42.

In various embodiments, the blowing tube 42 extends between the first and second blowing frame sidewalls, 52, 56 (e.g., between the first and second enclosed blowing frame sidewall chambers 54, 58). In various embodiments, the blowing tube 42, first enclosed blowing frame sidewall chamber 54, and second enclosed blowing frame sidewall chamber 58 define a substantially continuous channel configured for the transmission of airflow. As shown in FIG. 3, the blowing tube 42, the first blowing frame sidewall 52, and the second blowing frame sidewall 56 define at least a portion of the open area 12 within the shroud device 10.

In various embodiment, such as the embodiment shown in FIG. 2, the at least one blowing slot 44 comprises a single blowing slot. In other embodiments, the at least one blowing slot 44 may comprise any other suitable number of blowing slots. In some embodiments, the at least one blowing slot 44 may comprise a plurality of openings having any other suitable shape or configuration (e.g., such as a plurality of blower openings having any suitable shape such as circular, rectangular, polygonal, elliptical, etc.).

In particular embodiments, the upper suction portion 20 is integrally formed with the lower blowing portion (e.g., the suction frame 21 is integrally formed with the blowing frame 41). In particular embodiment, the upper blowing portion 20 and the lower suction portion 40 are substantially co-facing (e.g., co-facing), for example, along the line 18 shown in FIG. 1. In various embodiments, the upper blowing portion 20 and the lower suction portion 40 may be affixed in any suitable manner (e.g., using any suitable adhesive, fastener, etc.).

In various embodiments, such as the embodiment shown in FIG. 1, the shroud device 10 is configured such that when the shroud device 10 is used in conjunction with a sprayer 60, the spray 62 from the sprayer 60 (e.g., a centerline of the spray 62) forms an angle of between about fifteen degrees and about thirty degrees with a line perpendicular to the medium 90 (e.g., when the paint shroud is positioned such that the spray cutaway 28 is substantially parallel (e.g., parallel) to the medium 90. In other embodiments, the spray 62 from the sprayer 60 (e.g., a centerline of the spray 62) forms an angle of about twenty degrees with the line perpendicular to the medium 90 (e.g., such as line 18). In other embodiments, such as those described below, the spray 62 may form any other suitable angle relative to the medium 90 (e.g., up to about ninety degrees to the medium, ninety degrees to the medium, etc.).

Operation of Asymmetrical Shroud

Figure 4:
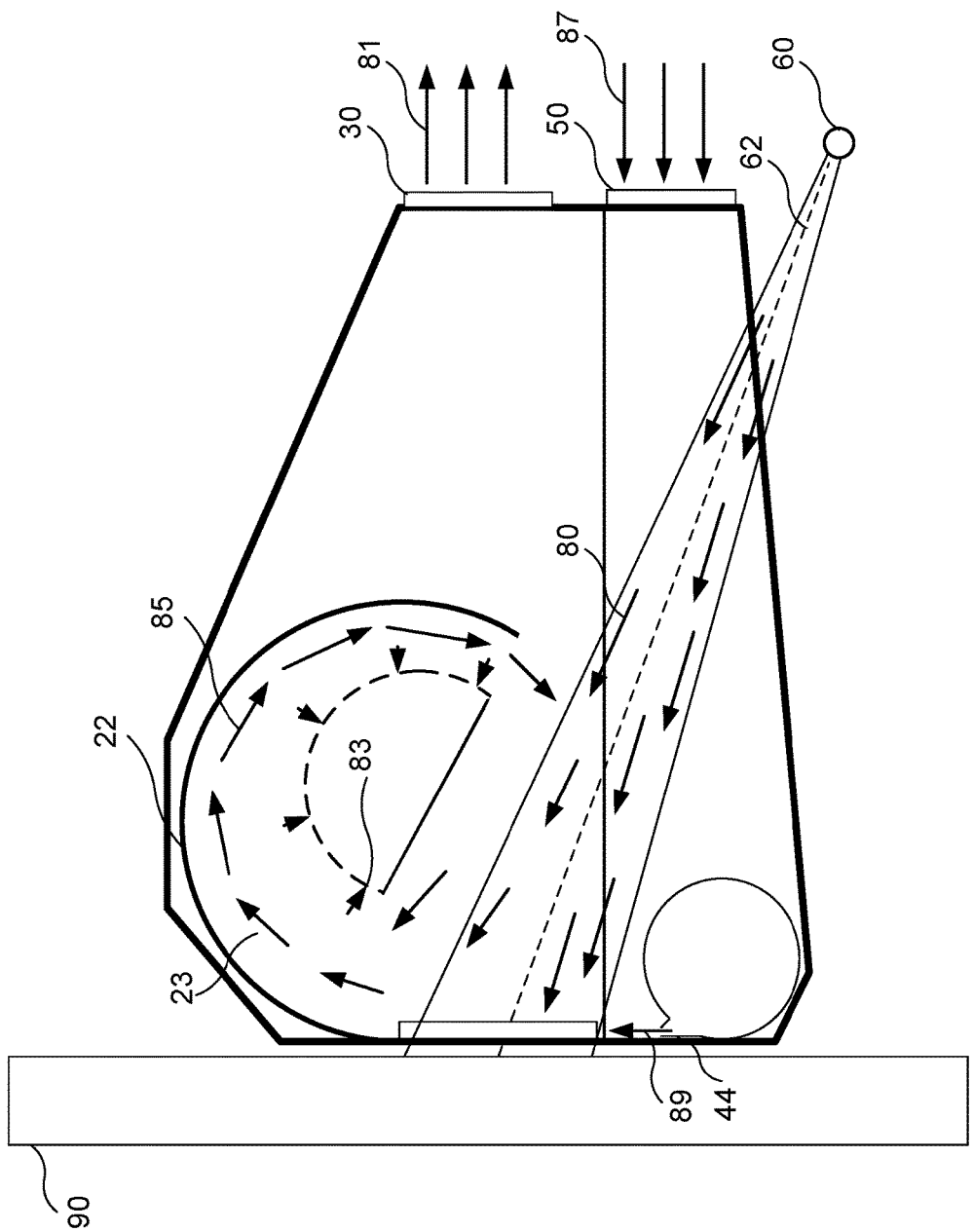
FIG. 4 is a side cutaway view of the shroud device shown in FIG. 1, showing exemplary air flow in the shroud device.
Figure 5:
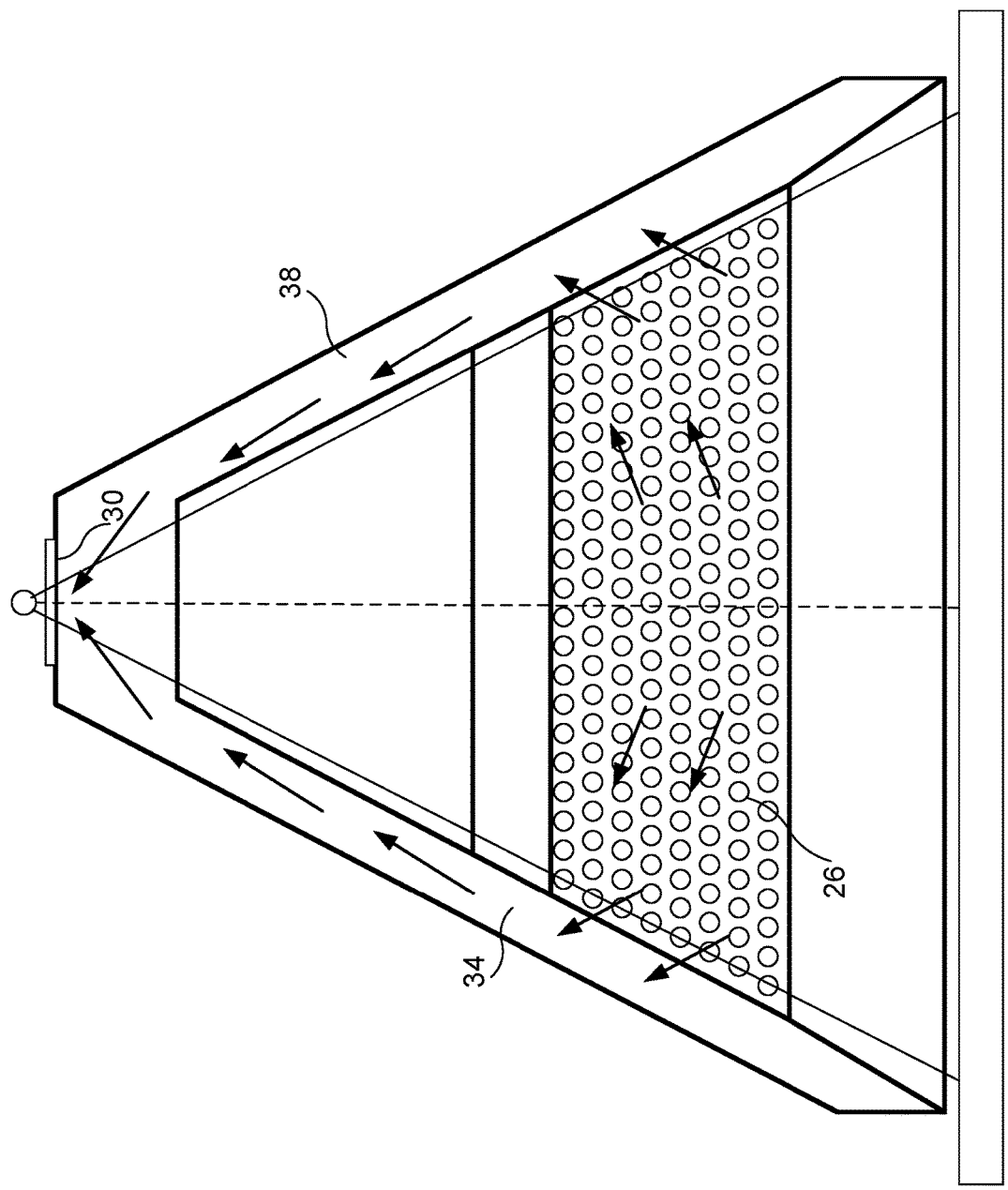
FIG. 5 is a cutaway view of the shroud device shown in FIG. 1, showing exemplary air flow in the suction portion.
Figure 6:
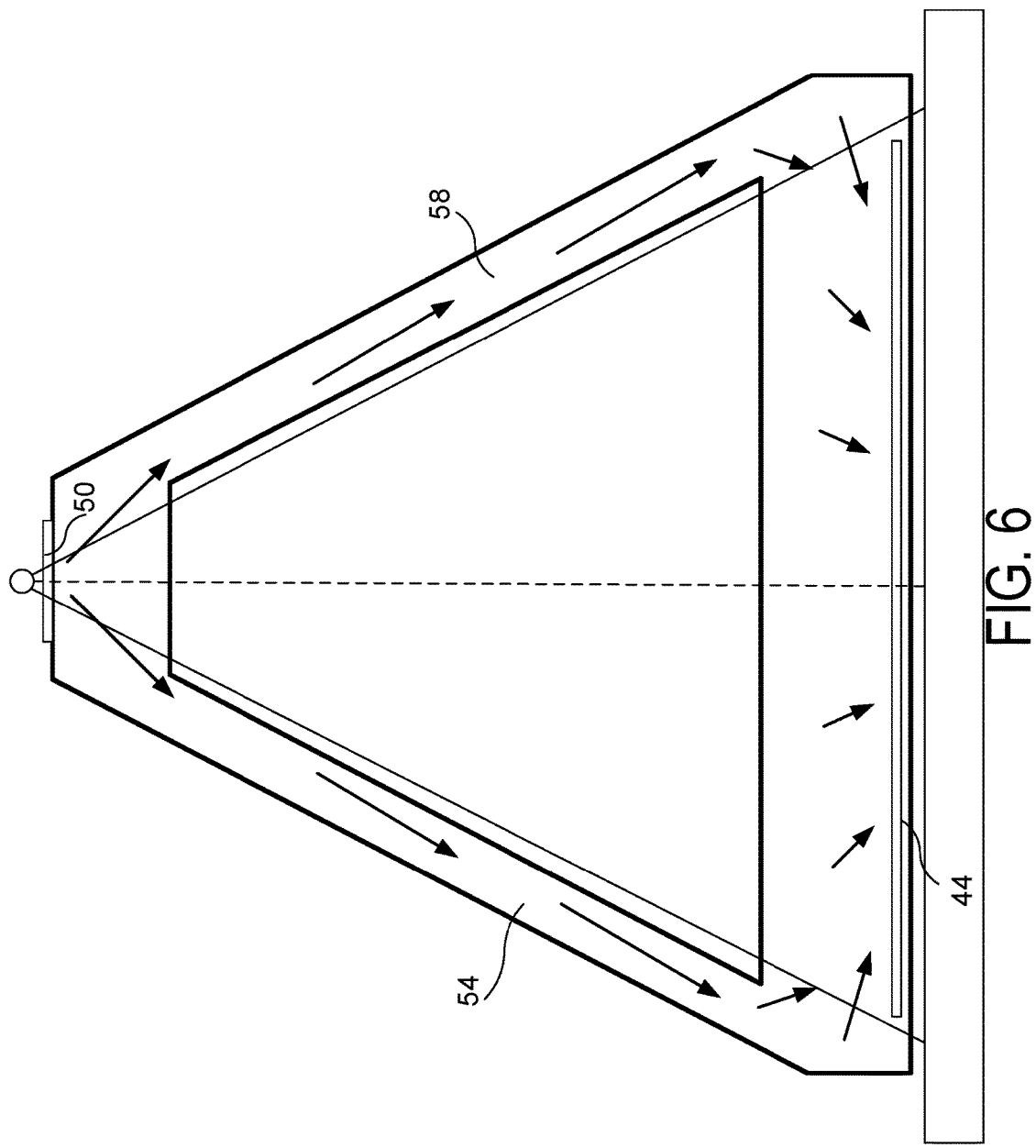
FIG. 6 is a cutaway view of the shroud device shown in FIG. 1, showing exemplary air flow in the blowing portion.
Figure 7:
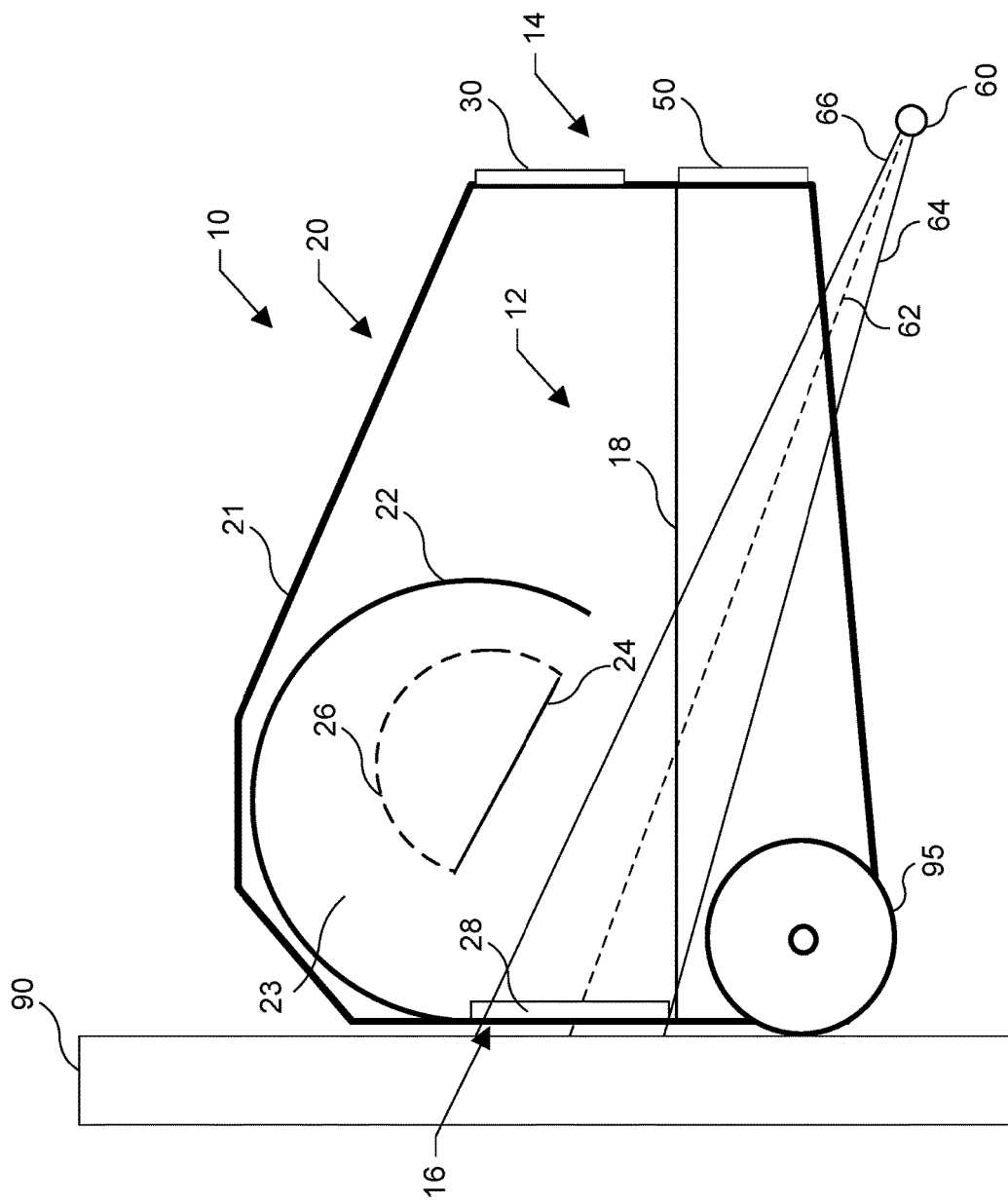
FIG. 7 is a side cutaway view of a shroud device according to a particular embodiment including a roller.
Figure 8B:
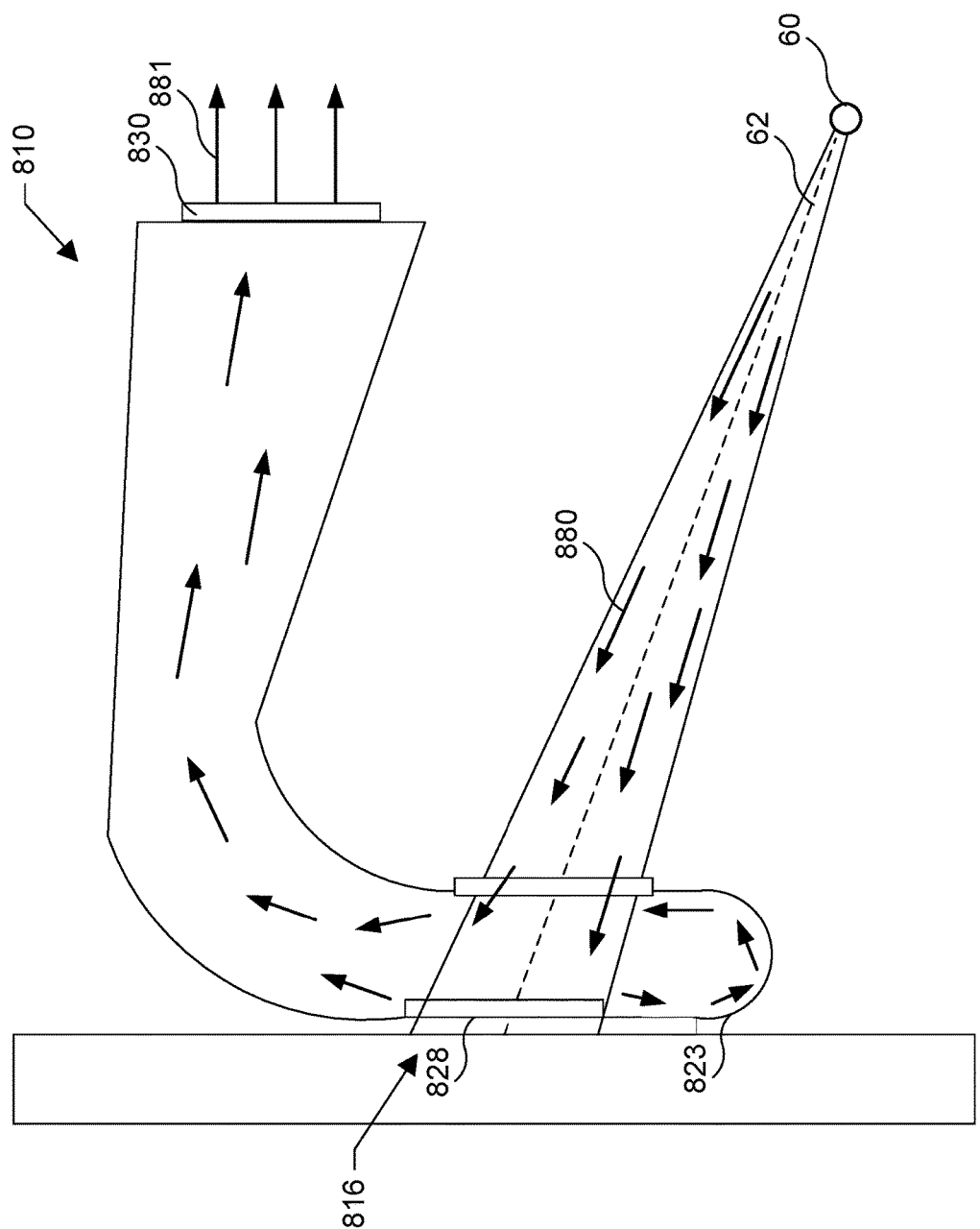
FIG. 8B is a side cutaway view of a shroud device according to a particular embodiment including a flow reverse half cylinder.
Figure 9:
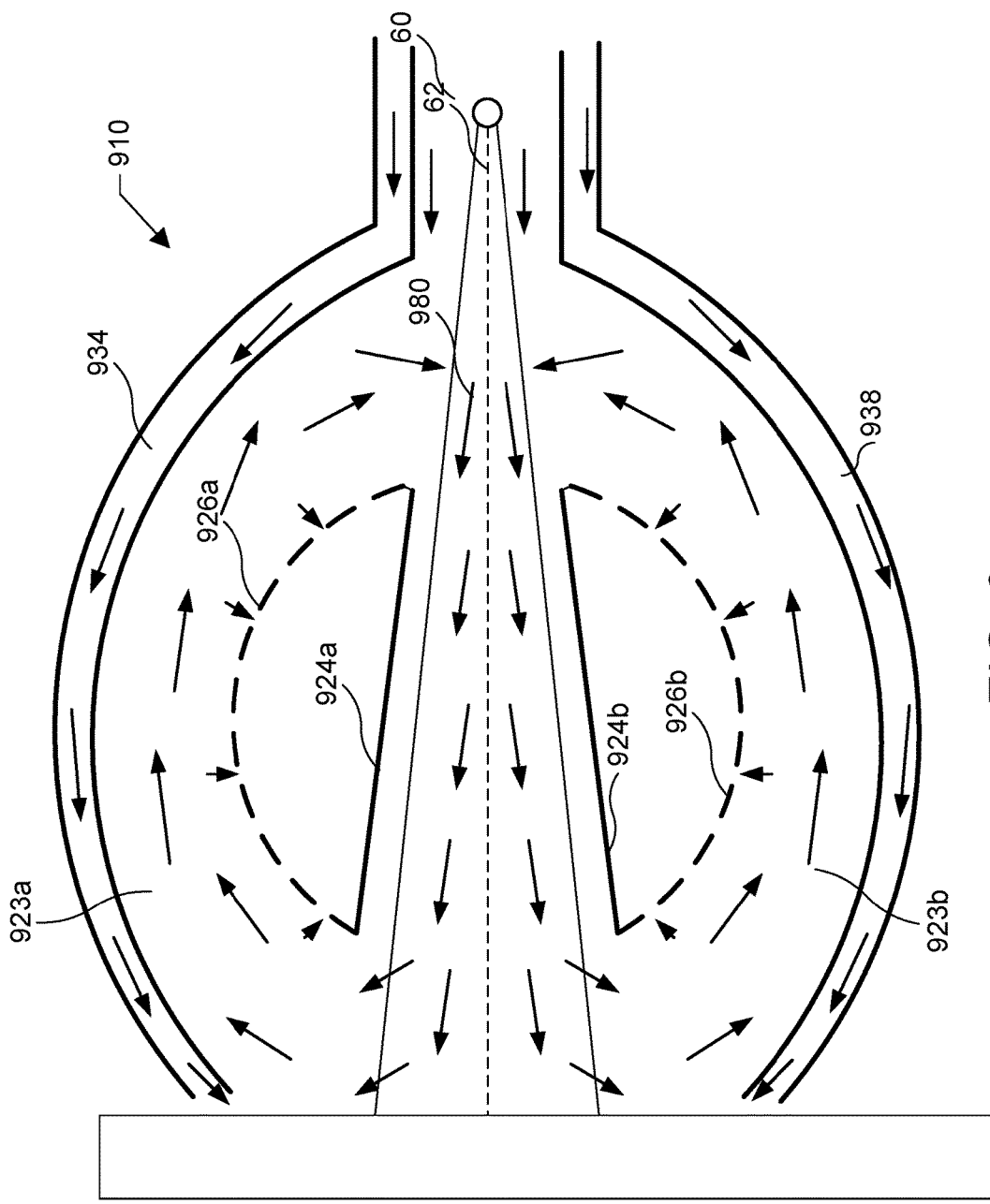
FIG. 9 is a side cutaway view of a shroud device according to yet another embodiment.
Figure 10A:
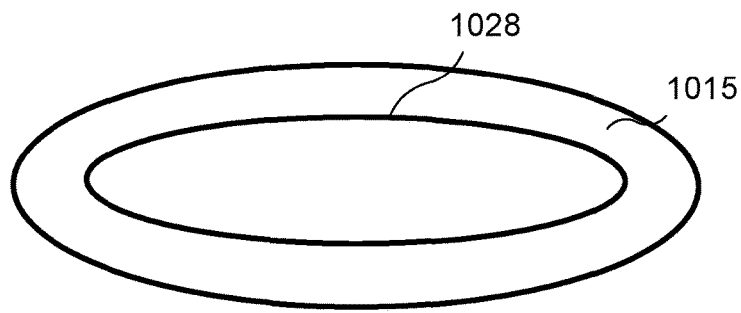
FIGS. 10A-11B depict shroud devices for use in ceiling painting applications according to various embodiments.
Figure 10B:
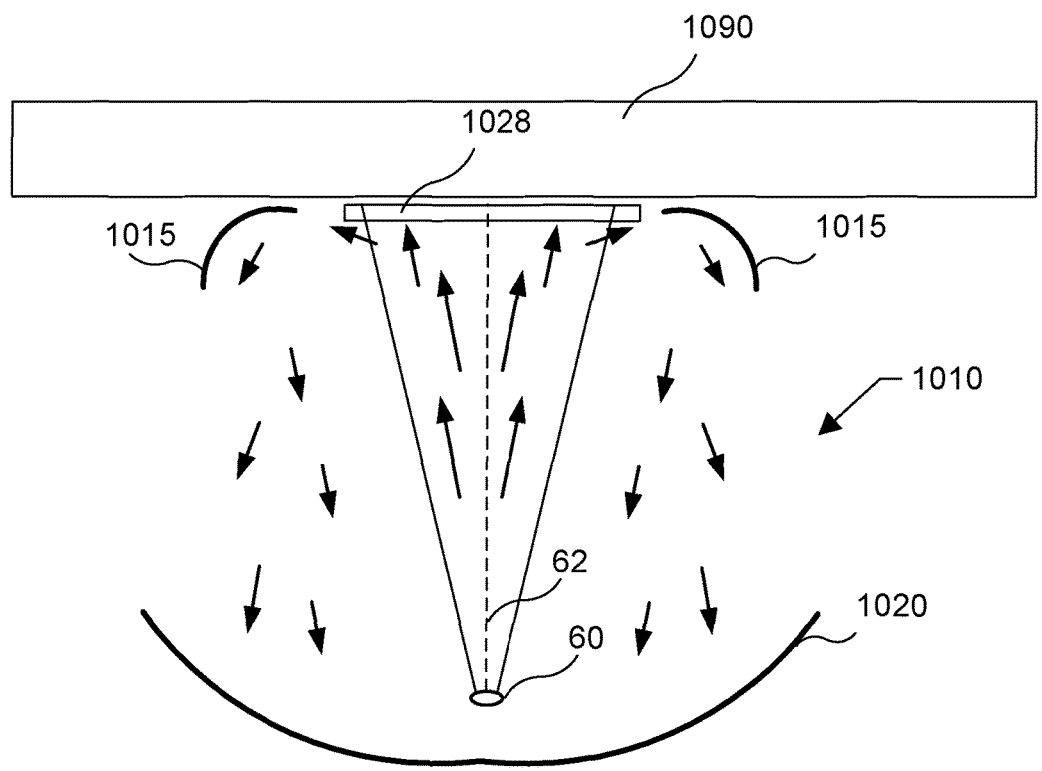
Figure 11A:
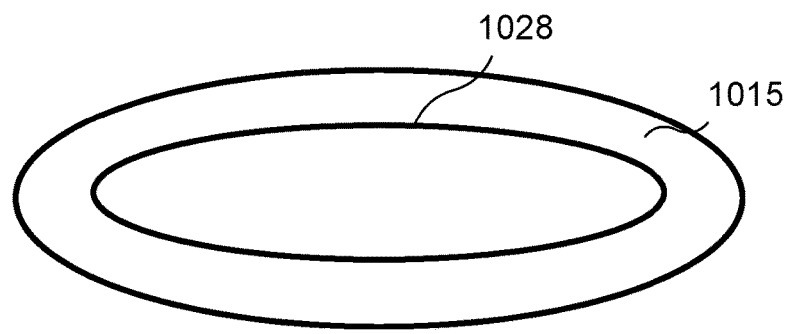
Figure 11B:
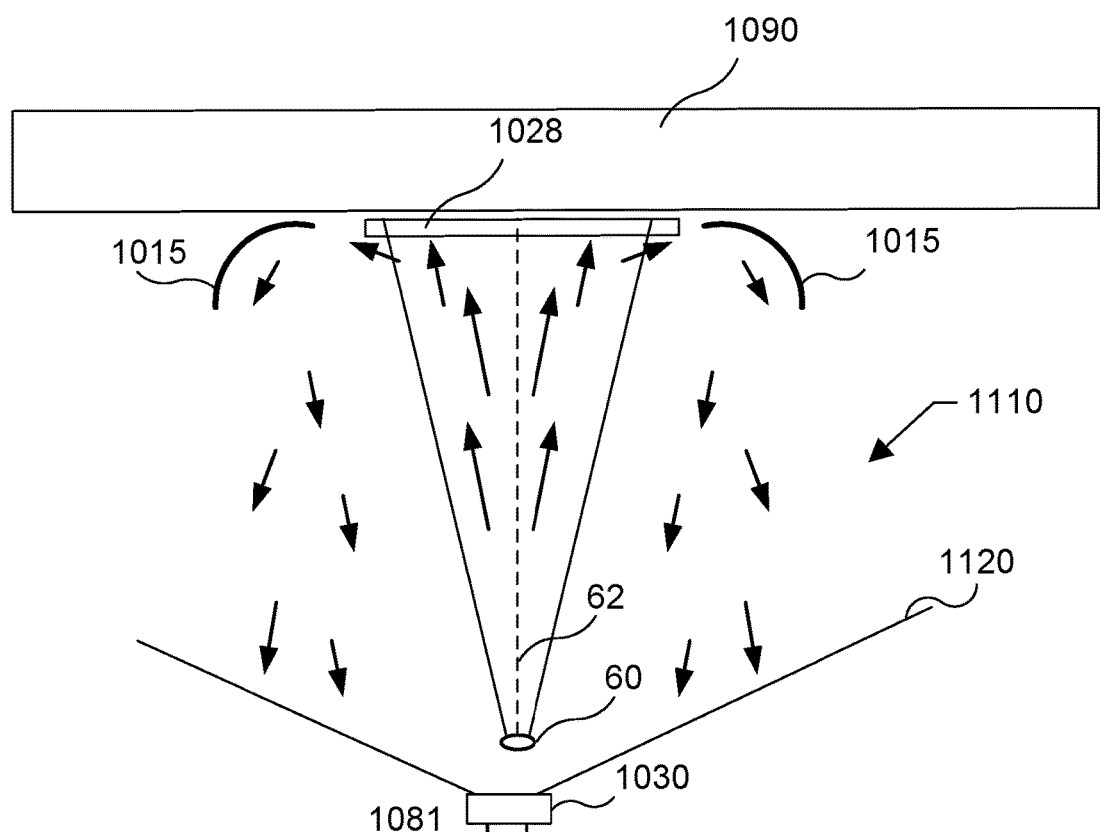

FIG. 4 depicts a side cutaway view of the asymmetrical shroud device 10 according to a particular embodiment, illustrating a direction of airflow within the shroud device 10 during operation of the shroud device. As may be understood by one skilled in the art, overspray from a sprayer 60 (e.g., as a result of impact with a medium 90 and other factors) may comprise a plurality of droplets, which may, for example, vary in size from between about 25 micrometers to about 150 micrometers. In various embodiments, the larger droplets may tend to impact the medium 90 and stick at a higher rate than smaller droplets.

In particular embodiments, only a portion of the spray 62 from the sprayer 60 may impact the wall and stick (e.g., only about 65%, only about 60%, up to about 75%, up to about 80%, up to about 95%, etc.). A remainder of the spray 62 may result in overspray as discussed above. In particular embodiments, the shroud device 10 is configured to utilize one or more air flows to manipulate the overspray such that at least a portion of the overspray is deposited on the wall (e.g., resulting in up to 100% application of the medium 90, up to about 90% application to the medium 90, up to about 95% application to the medium 90, etc.). In other embodiments, the shroud device 10 is configured to utilize one or more air flows to recapture (e.g., for recycling or later reuse) at least a portion of the overspray (e.g., via suction).

As may be understood from FIG. 4, the spray 62 from the sprayer 60 flows in a direction dictated by a spray pattern 80 and includes at least some entrained air. As shown in FIG. 4, as the spray 62 impacts the medium 90, a blowing force 89 from the at least one blowing slot 44 directs overspray (e.g., at least some of the overspray) that would have turned in a downward direction back up into the shroud device 10 toward the recirculation shroud 22. As may be understood in light of the description above, it should be understood that forced air from a blower 87 introduced to the shroud device via the blower access cutaway 50 may flow via the communication channel to the blowing tube and out the at least one blowing slot 44 in order to create the blowing force 89).

Additionally, overspray (e.g., at least some of the overspray) that would have turned in an upward direction may flow back into the shroud device 10 based on a relative position of the shroud device 10 to the medium and a curved shape of the recirculation shroud 22. In various embodiments, the shroud device 10 is configured to be positioned between about zero and about one half inches from the medium 90. In a particular embodiment, the shroud device 10 is configured to be positioned about one quarter inch from the medium 90 during spraying.

As may be understood from FIG. 4, as the overspray is directed upward toward the recirculation shroud 22, the plurality of droplets that make up the overspray are directed through the recirculation channel 23. At least a portion of the droplets may impact the recirculation shroud 22 and bounce of (e.g., or flow along a surface of the recirculation shroud 22). The droplets impacting the recirculation shroud 22 may bounce off as a result of the hydrophobic material (e.g., or coating) that makes up the shroud 22. As shown in FIG. 4, these droplets are reintroduced to the spray pattern 80 (e.g., sprayer flow) and at least a portion of them will impact the medium 90 and stick. At least some of the droplets may go through one or more iterations of travelling through the recirculation channel 23 and reentering the spray flow 80. Such droplets may, after sufficient recirculation, be deposited on the medium 90.

As may be further understood from FIG. 4, entrained air in the spray, plus the biasing blowing force 89 may require removal from the shroud device 10. The air may be removed, for example, via the plurality of suction holes 26. A suction force 83 through the plurality of suction holes 26 may suck air from within the shroud device 10 (e.g., within the recirculation channel 23) out through the suction access cutaway 30 via one or more suitable communication channels (e.g., the enclosed channels described above). As may be understood from FIG. 4, a vacuum or other pressure regulation device may be configured to attach to the suction access cutaway 30 (e.g., via a suitable hose, tube, etc.) to generate a suction force 81 that causes the suction force 83 through the plurality of suction holes 26.

In particular embodiments, the suction force 83 may remove at least some paint droplets from the recirculation channel 23 (e.g., particularly smaller droplets). In such embodiments, the plurality of suction holes may be coated with a hydrophobic coating to reduce potential blockage and sticking within the plurality of suction holes 26. In various embodiments, the droplets removed via the suction force 83 may constitute less than about 5% of the overspray (e.g., by mass). In particular embodiments, the system may comprise a cyclone separator for removing paint droplets from the suctioned air. In various embodiments, the cyclone separator may include any suitable cyclone separator or series of cyclone separators.

In a particular embodiment, a volumetric airflow approaching the medium 90 may be about 0.18 $m^3/s$. In some embodiments, the estimated blower flow required for the shroud device to operate may be about 80 cubic feet/minute. In various embodiments, a total flow to the shroud (e.g., the recirculation shroud 22) may be about 460 cubic feet/minute. In other embodiments, a suction into the suction tube 24 via the plurality of holes 26 may be about 300 cubic feet/minute. In some embodiments, the bypass flow back to the sprayer flow (e.g., via the recirculation channel 23), which may include a plurality of the overspray droplets, may be about 110 cubic feet/minute. In some embodiments, up to about 50 cubic feet per minute of air may be suctioned off using one or more side suction devices.

FIGS. 5 and 6 depict cutaway views of the upper suction portion and the lower blower portion. FIG. 5 further illustrates airflow between the plurality of suction holes 26 and the suction access cutaway 30 (e.g., via the first and second enclosed suction frame sidewall chambers 34, 38). FIG. 6 further illustrates airflow between the blower access cutaway 50 and the at least one blowing slot 44 (e.g., via the first and second enclosed blowing frame sidewall chambers 54, 58).

Alternative Embodiments

FIGS. 7-11 show additional embodiments of a shroud device according to various embodiments. As may be understood from these figures, various embodiments of a shroud device may include features in addition to or that vary from those described above. Various alternative embodiments are described more fully below.

Shroud Device with Roller or Simulated Rolling

In particular embodiments, such as the embodiment shown in FIG. 7, the shroud device 10 comprises a roller 95 (e.g., a paint roller) disposed adjacent the spray release end 16. As may be understood from this figure, the roller 95 may be configured to rotate about its central axis and apply a texture to paint sprayed on the medium 90. In this way, the shroud may be configured to apply a rolled texture to a painted wall while still utilizing the shroud to capture overspray and reduce wasted paint and harmful emissions. In the embodiment shown in this figure, the shroud device 10 may not comprise a blowing portion. In some embodiments, the roller 95 comprises a biasing mechanism for biasing the roller 95 against the medium 90 during painting (e.g., such as one or more springs, coil springs, linear springs, etc.).

In a particular embodiment that comprises a roller, a volumetric airflow approaching the medium 90 may be about 0.18 $m^3/s$ (e.g., about 380 cubic feet/minute). In other embodiments, a suction into the suction tube 24 via the plurality of holes 26 may be about 260 cubic feet/minute. In some embodiments, the bypass flow back to the sprayer flow (e.g., via the recirculation channel 23), which may include a plurality of the overspray droplets, may be about 80 cubic feet/minute. In some embodiments, up to about 40 cubic feet per minute of air may be suctioned off using one or more side suction devices.

In particular other embodiments, the shroud device may be configured to simulate a rolled texture of the sprayed paint on the medium 90 using one or more forced air sources. For example, the shroud device (e.g., any suitable shroud device described herein) may comprise a plurality of blowing openings that are each configured to blow air in a particular location at the medium 90. In particular embodiments, this blown air may smear the wet paint as it impacts the medium 90 in order to create a desired wall texture. In some embodiments, the system may be configured to adjust a pressure of air blown from any particular one of the one or more openings (e.g., in any suitable manner). In other embodiments, the system is configured to apply a substantially consistent pressure to produce a consistent smearing effect on the wall.

Shroud Device with Flow Reverse Half Cylinder

In particular embodiments, the shroud device 810 (e.g., such as the embodiments shown in FIGS. 8*a*-8*b*) is substantially L-shaped (e.g., L-shaped) and comprises a substantially half-cylindrical (e.g., half-cylindrical) flow reversal portion 823 disposed adjacent a spray release end 816 of the shroud device 810. As may be understood from these figures, overspray is directed downward into the flow reversal portion 823 and the suction force 881 causes the overspray to recirculate into the sprayer flow 880. As with the embodiments described above, at least some of the droplets that make up the overspray may go through one or more iterations of travelling through the flow reversal portion 823 and reentering the sprayer flow 880. Such droplets may, after sufficient recirculation, be deposited on the medium 90.

In still further embodiments, the suction force 883 may remove at least some paint droplets from the flow reversal portion 823 (e.g., particularly smaller droplets). In various embodiments, the droplets removed via the suction force 883 may constitute less than about 5% of the overspray (e.g., by mass). In particular embodiments, the system may comprise a cyclone separator for removing paint droplets from the suctioned air. In various embodiments, the cyclone separator may include any suitable cyclone separator or series of cyclone separators. IN other embodiment, the system may include a suitable filter for removing one or more paint droplets from the suctioned air.

In various embodiments, the shroud device 810 shown in these figures may further comprise one or more side suction openings 811, such as any suitable side suction opening described above. In various embodiments, each side suction opening 811 (e.g., side slot) may be about one inch in length, or any other suitable length. Any suitable surface of the shroud device 810 shown in these figures may be coated with a hydrophobic material (e.g., a super-hydrophobic material). These may include, for example, any surface which may come in contact with paint.

Symmetrical Shroud Device

FIG. 9 depicts a symmetrical shroud device 910 according to a particular embodiment. As may be understood from this figure, the symmetrical shroud device 910 comprises a first and second suction tube 924*a*, 924*b*, each defining a plurality of suction holes 926*a*, 926*b*. As may be understood from this figure, the symmetrical shroud device 910 defines two recirculation channels 923*a*, 923*b* configured to recirculate overspray back into a sprayer flow 980. As shown in this figure, the symmetrical shroud device further comprises a first and second enclosed chamber 934, 938 for blowing air adjacent a spray release end of the shroud device 910.

As may be understood in light of this disclosure, the first and second enclosed chambers 934, 938 are configured to redirect overspray (e.g., a plurality of overspray droplets) back into the shroud device 910. The air flow may then direct the overspray droplets via one or more of the recirculation channels 923*a*, 923*b* back into the sprayer flow 980. In other embodiments, a shroud device may comprise any suitable number of suction tubes, recirculation shrouds, and corresponding recirculation channels for redirecting overspray back to a sprayer flow (e.g. three, four, five, six, seven, up to ten, etc.).

Ceiling Painting Shroud Device

FIGS. 10 and 11 depict a ceiling painting shroud device 1010 according to various embodiments. FIG. 10*a* depicts a top view of a ceiling painting shroud device 1010. As may be understood from this figure, the ceiling painting shroud device 1010 defines a substantially elliptical (e.g., elliptical) spray cutaway 1028 and comprises a turning enclosure 1015.

FIG. 10*b* depicts the ceiling painting shroud device 1010 of FIG. 10*a* in a side cutaway view. As may be understood from this figure, the turning enclosure 1015 (e.g., curved flow deflector) comprises a curved surface that runs around a perimeter of the spray cutaway 1028 and curves from parallel to the spray surface 1090 (e.g., a ceiling) to perpendicular to the spray surface. In various embodiments, the turning enclosure 1015 has a radius of at least about a few inches (e.g., three inches). In particular embodiments, the turning enclosure 1015 is configured to deflect overspray at the spray area back into the shroud 1010.

In various embodiments, the ceiling painting shroud device 1010 further comprises a passive collector 1020. As may be understood from this figure, the passive collector may comprise any suitably shaped reservoir for collecting and maintaining overspray droplets for later re-use or recycling.

FIGS. 11*a*-*b* depict a ceiling painting shroud device 1110 according to yet another embodiment. In the embodiment shown in this figure, the ceiling painting shroud device 1110 defines a substantially elliptical (e.g., elliptical) spray cutaway 1028 and comprises a turning enclosure 1015. As may be understood from this figure, the turning enclosure 1015 (e.g., curved flow deflector) comprises a curved surface that runs around a perimeter of the spray cutaway 1028 and curves from parallel to the spray surface 1090 (e.g., a ceiling) to perpendicular to the spray surface. In various embodiments, the turning enclosure 1015 has a radius of at least about a few inches (e.g., three inches). In particular embodiments, the turning enclosure 1015 is configured to deflect overspray at the spray area back into the shroud 1110. In some embodiments, the turning enclosure 1015 is substantially structurally similar to the turning enclosure described with respect to FIG. 10.

In various embodiments, the ceiling painting shroud device 1110 further comprises an active collector 1120. As may be understood from this figure, the active collector may comprise any suitably shaped reservoir for collecting and maintaining overspray droplets for later re-use or recycling. In the embodiment shown in this figure, the active collector 1120 further defines a suction inlet 1030 via which a suction force 1081 may remove at least a portion of the droplets collected by the active collector 1120. The suction force 1081 utilized may be similar to any suction force described herein, or any other suitable suction force for sufficiently removing the overspray droplets.

In particular embodiments, a ceiling painting shroud device may be substantially asymmetrical. In such embodiments, a substantially asymmetrical shaped shroud device may be configured to accommodate a plurality of overspray droplets falling in an irregular pattern due to movement of the shroud during painting (e.g., along a ceiling surface). In various embodiments, the shroud may be designed to paint a ceiling of a rate of between about 1 foot per second and about two feet per second. In some embodiments, the shroud is configured to be removed from a sprayer for the purpose of collecting any paint that is collected in a collector. In particular embodiments, the shroud may comprise two halves and be configured to remove at a first half of the two halves while painting a portion of the ceiling where the ceiling abuts a wall.

Application of Non-Paint Materials

Although various embodiments of a shroud device are described above in the context of applying paint or other liquid to a surface, it should be understood that other embodiments may utilize any suitable technique described herein to apply any other suitable material (e.g., either singularly or additively). These other materials may include, for example, stucco, cement, gunite, one or more plastics, insulation, foam, or other suitable materials. In various other embodiments, one or more techniques described herein may be utilized for the application of any other suitable material such as, for example, a solid material (e.g., a powder, sand, glitter, pellets such as BBs etc.), semi-solid material, a molten material, gaseous material, plasma, textured material, solid suspended in a liquid, etc. The system may, for example be utilized to apply any material in any suitable location regardless of a density, consistency, or other property of the material.

In various embodiments, the system is configured to utilize any suitable technique herein to apply any suitable material under pressure (e.g., through an orifice, via a suitable mold, etc.). In particular embodiments, the system is configured to atomize a material for application. In other embodiments, the system is configured to apply the material in its substantially natural state. In still other embodiments, the system is configured to apply one or more materials in a suitable matrix. In some embodiments, the system is configured to utilize one or more techniques described herein in a suitable 3-D printing application (e.g., portable and/or largescale 3-D printing).

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, while the above shroud is discussed in particular in regard to paint, it should be understood that various other embodiments may be configured to apply any other liquid to any other suitable surface using any of the techniques described herein. Furthermore, any combination of any features described may be utilized in the context of any specific embodiment. Additionally, certain embodiments may comprise a portion of features attributed to any particular embodiment described herein. For example, although one or more features may not be discussed in relation to one another, various embodiments of a paint robot may utilize any feature of component described herein in any combination. Although specific terms are employed herein, they are used in a generic and descriptive sense only and not for the purposes of limitation.

What is claimed is:

1. A shroud device for use in spraying applications, the shroud device having a base portion and a spray release end, defining an open area within the shroud device, and comprising:
   a suction portion comprising:
      a suction frame flaring from the base portion to the spray release end, defining a suction access cutaway adjacent the base portion and a spray cutaway disposed adjacent the spray release end, wherein:
         the suction frame comprises a recirculation shroud, the recirculation shroud being in communication with the suction access cutaway and defining at least one suction hole; and
         the spray cutaway is dimensioned to enable spray from a sprayer to pass through the shroud device such that at least a portion of the spray is deposited upon a medium via the spray cutaway;
   a blowing portion comprising:
      a blowing frame flaring from the base portion to the spray release end, defining a blower access cutaway adjacent the base portion, and comprising:
         a blowing tube disposed adjacent the spray release end, the blowing tube being in communication with the blower access cutaway and defining at least one blowing slot, wherein:
   the blowing portion and the suction portion are co-facing;
   the shroud device is configured to recirculate a plurality of overspray droplets from the spray within the shroud device via a combination of a suction force introduced within the shroud via the at least one suction hole and a blowing force introduced within the shroud via the at least one blowing slot.

2. The shroud device of claim 1, wherein the blowing frame comprises:
   a first blowing frame sidewall defining a first enclosed blowing frame sidewall chamber, the first enclosed blowing frame sidewall chamber extending between a first end of the blowing tube and the blower access cutaway, and facilitating the communication between the blower access cutaway and the blowing tube; and
   a second blowing frame sidewall defining a second enclosed blowing frame sidewall chamber, the second enclosed blowing frame sidewall chamber extending between a second end of the blowing tube and the blower access cutaway, and facilitating the communication between the blower access cutaway and the blowing tube.

3. The shroud device of claim 2, wherein the suction frame comprises:
   a first suction frame sidewall defining a first enclosed suction frame sidewall chamber, the first enclosed suction frame sidewall chamber extending between a first end of the recirculation shroud and the suction access cutaway, and facilitating the communication between the suction access cutaway and the recirculation shroud; and
   a second suction frame sidewall defining a second enclosed suction frame sidewall chamber, the second enclosed suction frame sidewall chamber extending between a second end of the recirculation shroud and the blower access cutaway, and facilitating the communication between the suction access cutaway and the recirculation shroud.

4. The shroud device of claim 3, wherein the recirculation shroud extends between the first suction frame sidewall and second suction frame sidewall through the open area of the shroud device.

5. The shroud device of claim 4, wherein the recirculation shroud comprises a semi-elliptical prism.

6. The shroud device of claim 3, wherein the at least one slot extends from the first enclosed blowing frame sidewall chamber to the second enclosed blowing frame sidewall chamber.

7. The shroud device of claim 1, wherein the at least one suction hole defines a plurality of suction holes.

8. The shroud device of claim 7, wherein the plurality of suction holes comprise 360 suction holes.

9. The shroud device of claim 1, wherein:
the shroud device comprises a roller; and
the roller comprises a biasing mechanism for biasing the roller against the medium while the sprayer is applying a spray to the medium.

10. The shroud device of claim 1, wherein the spray cutaway is positioned such that when the shroud device is used in combination with the sprayer, the sprayer sprays at an angle of between about fifteen degrees and about thirty degrees from perpendicular to a plane defined by the spray cutaway.

11. The shroud device of claim 10, wherein the spray cutaway is positioned such that when the shroud device is used in combination with the sprayer, the sprayer sprays at an angle of about twenty degrees from perpendicular to the plane defined by the spray cutaway.

12. The shroud device of claim 1, wherein the recirculation shroud is configured to recirculate at least a portion of the plurality of overspray droplets back into the spray and onto the medium.

13. A paint sprayer shroud for recirculating at least a portion of a plurality of overspray droplets from a sprayer back into a sprayer flow form the sprayer and onto a wall, the paint sprayer shroud comprising:
a suction frame flaring from a base portion to a planar spray release end, defining a suction access cutaway adjacent the base portion and a spray cutaway disposed adjacent the spray release end, wherein:
the suction frame comprises a curved recirculation shroud and a suction tube, the suction tube being in communication with the suction access cutaway and defining a plurality of suction holes; and
the spray cutaway is dimensioned to enable spray from a sprayer to pass through the paint sprayer shroud such that at least a portion of the spray is deposited upon a medium via the spray cutaway; and
a blowing frame flaring from the base portion to the spray release end, defining a blower access cutaway adjacent the base portion, and comprising:
a blowing tube disposed adjacent the spray release end, the blowing tube being in communication with the blower access cutaway and defining at least one blowing slot, wherein:
the recirculation shroud is dimensioned to recirculate at least a portion of the plurality of overspray droplets back into the sprayer flow and onto the medium; and
the paint sprayer shroud is configured to direct airflow via the at least one spray cutaway such that the airflow directs the plurality of overspray droplets upward toward the recirculation shroud.

14. The paint sprayer shroud of claim 13, wherein the suction frame comprises:
a first suction frame sidewall defining a first enclosed suction frame sidewall chamber, the first enclosed suction frame sidewall chamber extending between a first end of the suction tube and the suction access cutaway, and facilitating the communication between the suction access cutaway and the suction tube; and
a second suction frame sidewall defining a second enclosed suction frame sidewall chamber, the second enclosed suction frame sidewall chamber extending between a second end of the suction tube and the blower access cutaway, and facilitating the communication between the suction access cutaway and the suction tube.

15. The paint sprayer shroud of claim 14, wherein the recirculation shroud, the first suction frame sidewall, and the second suction frame sidewall define at least a portion of an open area within the paint sprayer shroud.

16. The paint sprayer shroud of claim 15, wherein the shroud is configured to:
cause the airflow to flow through the at least one spray cutaway such that the airflow directs the plurality of overspray droplets upward toward the recirculation shroud; and
remove at least a portion of entrained air from the shroud device via the plurality of suction holes.

17. The paint sprayer shroud of claim 13, further comprising a second suction tube, the second suction tube being in communication with the suction access cutaway and defining a second plurality of suction holes.

* * * * *